W. F. DARBY.
LOCKING DEVICE.
APPLICATION FILED JULY 12, 1920.
1,374,554. Patented Apr. 12, 1921.
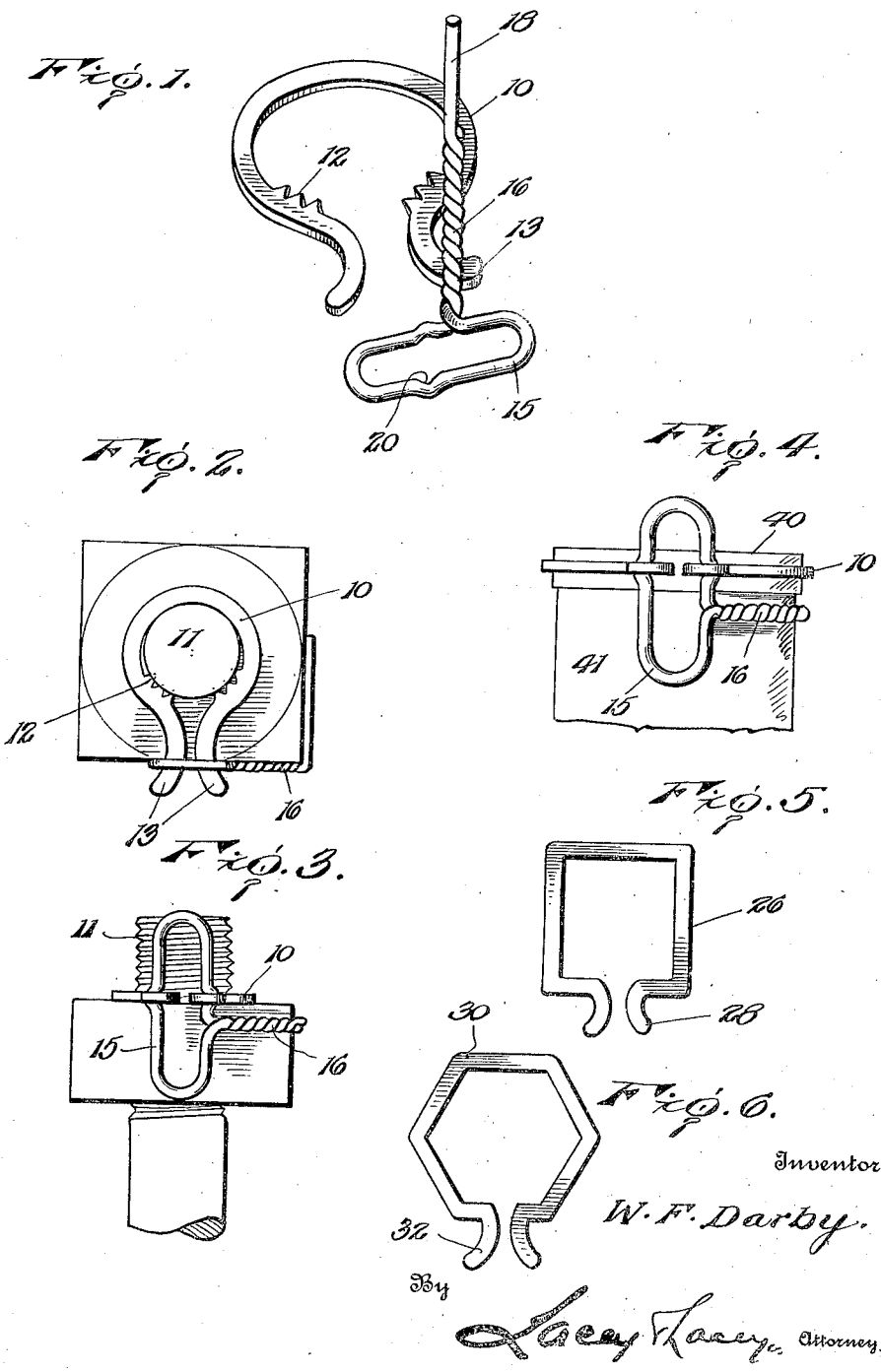

UNITED STATES PATENT OFFICE.

WILLIAM F. DARBY, OF JACKSONVILLE, MISSOURI.

LOCKING DEVICE.

1,374,554.  Specification of Letters Patent.  Patented Apr. 12, 1921.

Application filed July 12, 1920. Serial No. 395,467.

*To all whom it may concern:*

Be it known that I, WILLIAM F. DARBY, citizen of the United States, residing at Jacksonville, in the county of Randolph and State of Missouri, have invented certain new and useful Improvements in Locking Devices, of which the following is a specification.

This invention relates to improvements in locking devices especially adapted for use in connection with bolts, grease cups, stud bolts, lag screws and receptacle covers.

An important object of this invention is to provide a locking device of the above mentioned character which, when in use, will securely grip and therefore prevent the accidental loss of the object engaged.

A further object of the invention is to provide a locking device of the above mentioned character which is of highly simplified construction, convenient to apply, and efficient in use.

Other objects and advantages of the invention will be apparent during the course of the following description.

In the accompanying drawing forming a part of this application and in which like numerals are employed to designate like parts throughout the same, Figure 1 is a perspective view of the improved locking device, Fig. 2 is a plan view of the improved locking device applied to a nut and bolt, Fig. 3 is a side elevation of the improved locking device applied to a nut and bolt, Fig. 4 is a similar view of the improved locking device applied to the closure of a receptacle, Fig. 5 is a plan view of a slightly modified form of locking loop, Fig. 6 is a plan view of a further modification of the locking loop.

In the drawing, wherein for the purpose of illustration is shown a preferred embodiment of the invention, the numeral 10 designates a split locking loop which is adapted to be arranged about the shank of a bolt 11 so that the inwardly extending teeth 12 formed on the loop adjacent the ends of the same, may bite into the threads of the bolt. The end portions of the split locking loop 10 are curved outwardly to form manipulating arms 13.

When the split locking loop 10 has been applied to the shank of the bolt, the end portions 13 of the locking loop are adapted to be extended through the locking link 15 which is formed from a single length of wire having its end portions twisted together to form an arm 16. However, one terminal portion of the wire from which the arm and locking link are formed is extended beyond the other end portion of the wire and is adapted to be securely engaged with the article to be locked. With reference to Fig. 2 of the drawing, it will be observed that upon the application of the locking link 15 the extended end portion 16 of the locking link may be bent about one side of the nut and hammered firmly into engagement with the same. The locking link is formed at one side of the arm 16 with oppositely disposed notches 20 adapted to receive the outwardly extending manipulating arms 13 when the locking link is turned slightly for securely gripping the inwardly extending teeth 12 with the threads on the shank of the bolt.

In the form of the invention illustrated in Fig. 5, the locking loop, generally designated by the reference numeral 26, is rectangular and is split so that outwardly extending manipulating arms 28 may be provided. The locking arms 28 correspond in construction to the outwardly extending manipulating arms 13 and are adapted to be extended through the locking link 15. The rectangular locking loop 26 is especially adapted for use in securing lag screws and the like in place. Upon screwing the lag screw into the work, the rectangular locking loop 26 is arranged over the head of the screw and the locking link is subsequently engaged with the outwardly curved arms 28. The arm 16 may now be engaged with the adjacent portion of the work in such a manner that the locking loop 26 will be prevented from accidental displacement or movement.

The locking loop 30 illustrated in Fig. 6 is in the form of a hexagon and is split so that the end portions of the same may be extended outwardly for providing locking arms 32. The locking arms 32 correspond in construction to the arms 13 and 28 and are, therefore, adapted to be received within the locking link 15. The hexagonal locking loop 30 is especially adapted for use in connection with lag screws or bolts having hexagonal heads and is also adapted for use in connection with hexagonal bolts.

As illustrated in Fig. 4, the locking loop 10 may be arranged about the closure 40 of a cylindrical receptacle 41 and is preferably seated within an annular groove in the receptacle. Upon arranging the split locking loop 10 about the closure 40, the locking link 15 may be engaged with the outwardly directed arms 13 and subsequently given a quarter of a turn so that the arms will be received within the locking notches 20. Upon securely engaging the locking link 15 with the outwardly curved arms 13, the arms 15 of the locking link may be curved about the receptacle 41 so that the same will lie flat in contact with the receptacle. The locking link 15 will thus be prevented from accidental displacement.

With reference to the foregoing description taken in connection with the accompanying drawing, it will be observed that a locking device constructed in accordance with this invention may be readily and conveniently applied and when so applied will effectively prevent the accidental loss or displacement of the objects engaged. It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed as new is:

1. A device of the class described comprising a split loop having its end portions extended outwardly and flared, and a locking device adapted to be engaged about the flared end portions of said loop and having a bendable terminal to engage a part to be locked.

2. A device of the class described comprising a split loop to encircle a member to be locked and having its end portions flared to form arms, the inner portion of said loop being provided with teeth to secure said member, and an elliptical locking link adapted to be engaged with said arms and turned about the same to bind them together.

3. A device of the class described comprising a split loop having its end portions flared to form manipulating arms, and a locking link consisting of a wire having its ends twisted together to form an arm extending laterally from the link, said link being of elongated formation whereby it may be engaged across the manipulating arms and then turned about the same to bind them together.

4. A locking device of the class described comprising a split loop to engage around a member to be locked having its end portions flared outwardly, and a narrow locking link provided with notches on its opposed longitudinal walls and having a bendable arm extending from one side to engage around a second member to be locked, the link being adapted to be engaged across the flared arms of the loop and turned about the same to bind them together with the notches in the link engaging the outer edges of the arms whereby to prevent movement of the link across said edges, the flared form of the arms preventing movement of the link along said edges.

In testimony whereof I affix my signature.

WILLIAM F. DARBY. [L. S.]